United States Patent [19]

Bolinger

[11] Patent Number: 5,241,811
[45] Date of Patent: Sep. 7, 1993

[54] SICKLE COVERED KNIFEBACK

[76] Inventor: Ralph L. Bolinger, R.R. #1, P.O. Box 181, Roann, Ind. 46974

[21] Appl. No.: 833,777

[22] Filed: Feb. 11, 1992

[51] Int. Cl.$^5$ ..................... A01D 34/17; A01D 34/18
[52] U.S. Cl. ........................................ 56/310; 56/305
[58] Field of Search ............... 56/298, 307, 308, 309, 56/310, 311, 312, 313, 305

[56] References Cited

U.S. PATENT DOCUMENTS

| | | | |
|---|---|---|---|
| 497,320 | 5/1893 | Hillabold | 56/301 |
| 3,098,338 | 7/1963 | Myers | 56/307 X |
| 3,284,994 | 11/1966 | Hamel | 56/298 |
| 3,401,512 | 9/1968 | Pool et al. | 56/298 |
| 3,401,513 | 9/1968 | Rickerd | 56/298 |
| 3,553,948 | 1/1971 | White | 56/307 |
| 3,978,645 | 9/1976 | Bennett et al. | 56/310 |
| 4,286,425 | 9/1981 | Schumacher, II | 56/307 |
| 4,519,192 | 5/1985 | Oppenhuisen et al. | 56/298 |
| 4,520,618 | 6/1985 | Sorensen et al. | 56/307 X |
| 4,612,758 | 9/1986 | Schumacher, II et al. | 56/310 |
| 4,653,257 | 3/1987 | Schumacher, II et al. | 56/298 |
| 4,750,321 | 6/1988 | Klein | 56/310 |
| 5,054,277 | 10/1991 | Schumacher, II et al. | 56/299 |

FOREIGN PATENT DOCUMENTS 208026  1/1987  European Pat. Off. .............. 56/298

OTHER PUBLICATIONS

Publication by Gebr. Schumacher GmbH "Easy Cut Sickle Bar System" (undated).

Primary Examiner—David J. Bagnell
Attorney, Agent, or Firm—George Pappas

[57] ABSTRACT

A power-operated sickle for cutting agricultural plants and for preventing the cut stalk of the plant from coming in contact with reciprocating components of the sickle. The sickle includes a plurality of cutting teeth attached to a drive bar that is slidably retained on a stationary horizontally disposed sickle bar. A plurality of underside teeth are attached to the sickle bar and extend forwardly therefrom. A cover member is attached to the sickle bar and extends over covering the drive bar and other reciprocating components thereat. The cover member includes a plurality of upper teeth that extend over the underside teeth and sandwich the reciprocating cutting teeth therebetween. The cover member includes a semi-circular section extending between its attachment to the sickle bar and the upper teeth. The gap between the upper and underside teeth is selectively adjustable for a proper setting during initial assembly and for, thereafter, adjusting for wear of the cutting teeth, upper teeth, and underside teeth.

18 Claims, 2 Drawing Sheets

SICKLE COVERED KNIFEBACK

TECHNICAL FIELD

The present invention relates to the technical field of power-operated sickles for attachment to combines and the like for cutting agricultural plants such as soybean and wheat. More specifically, the present invention relates to improvements to a sickle for preventing the falling of the crop to the ground just after the cutting of the stalk thereof.

BACKGROUND OF THE INVENTION

Power-operated sickles have been and are presently widely used for the cutting of agricultural plants. These sickles normally include a plurality of reciprocating cutting teeth that move along stationary teeth and pinching and cutting the stalk of the plant in a scissor-like fashion. Typically, the sickle extends horizontally and laterally outward from the combine or tractor and is generally close to the ground for cutting the plants at the stalk without interfering with the crop. The reciprocating teeth are attached to and are driven by a drive bar which is itself reciprocally driven with power from the combine or tractor or a separate motor.

Certain components, such as the reciprocally-driven drive bar and portions of the cutting teeth are typically exposed from the upper side thereof for ease in assembly, replacement of parts, and general maintenance. In operation, as the sickle is pushed forwardly, the reciprocating teeth act to cut the stalk of the plant and rotating reels normally push the upper portion of the plant backwardly whereat the crop can be separated from the stalk. However, depending on the speed of the rotating reel, the speed of the combine or tractor and the general direction toward which the plant may be leaning causes the various plants to fall back at different rates. Quite often, a substantial portion of the plant is still forward of the sickle when the knife acts to cut the stalk thereof. In fact, quite often the stalk moves back toward the drive bar while a portion of the upper plant is still forward of the sickle. In such cases, the stalk may come in contact with the reciprocally driven components of the sickle and vibration forces are sent up through the stalk and to the rest of the plant. Further yet, because soybean pods and other pods can be fragile, the vibration causes the pod to break releasing the beans. Unfortunately, when the pod has not yet fallen back behind the sickle, the released beans fall directly to the ground in front of the sickle and are wasted. Yields are, in essence, decreased because a portion of the crop remains in the field and could not be harvested.

Accordingly, a need exists to smoothly cut the stalk of the plant without transferring vibration forces thereto generally prior to the plant falling backwardly over the sickle. Additionally, a need exists for a sickle design without cumbersome numerous components and which is relatively inexpensive to manufacture, long lasting, and generally easy to maintain.

SUMMARY OF THE INVENTION

It is the principle object of the present invention to overcome the above-discussed disadvantages associated with prior sickles. In this regard, the invention was conceived by studying and discovering the above-discussed phenomenon whereby crop is lost by vibrations transferred to the stalk of the plant immediately after cutting.

The present invention overcomes the problems and disadvantages associated with prior sickles with a cover member which is attached to the sickle bar and extends over and covers the drive bar. The cover member includes a plurality of upper teeth that extend over the underside teeth of the sickle and sandwich the reciprocating cutting teeth therebetween. The cover member, thus, prevents a plant stalk which has been cut from coming in contact with the reciprocally driven drive bar or other reciprocating components and, thus, prevents the plant from being vibrated and potentially dropping the crop forward of the sickle. In addition, the cover member acts to provide the necessary cutting edge and guard for the reciprocating cutting teeth. Both the upper stationary teeth of the cover member and the underside stationary teeth include cutting edges and the reciprocating cutting teeth cut against both the upper and the underside teeth.

Preferably, each cover member includes four teeth and is attached to the sickle bar with two bolts. The cover further preferably includes a semi-circular section extending between its attachment to the sickle bar and the upper teeth. A recess may be provided in the semi-circular section whereby an opening is created between the semi-circular section and the sickle bar leading to the drive bar. Through this recess, dirt and soil are rejected from the reciprocating drive bar area.

The gap between the upper stationary cover member teeth and the underside teeth can be selectively adjusted. In this regard, shim members are provided between the cover member and the sickle bar and the gap distance is adjusted by selectively providing a number of shim members. Preferably, the cover member is attached to the sickle bar with bolts and washers are received on the bolts between the cover member and the sickle bar and are used as shim members.

DESCRIPTION OF THE DRAWINGS

The above-mentioned and other features and objects of this invention and the manner of obtaining them will become more apparent and the invention itself will be better understood by reference to the following description of a specific embodiment of the invention taken in conjunction with the accompanying drawings wherein.

Figure 1:
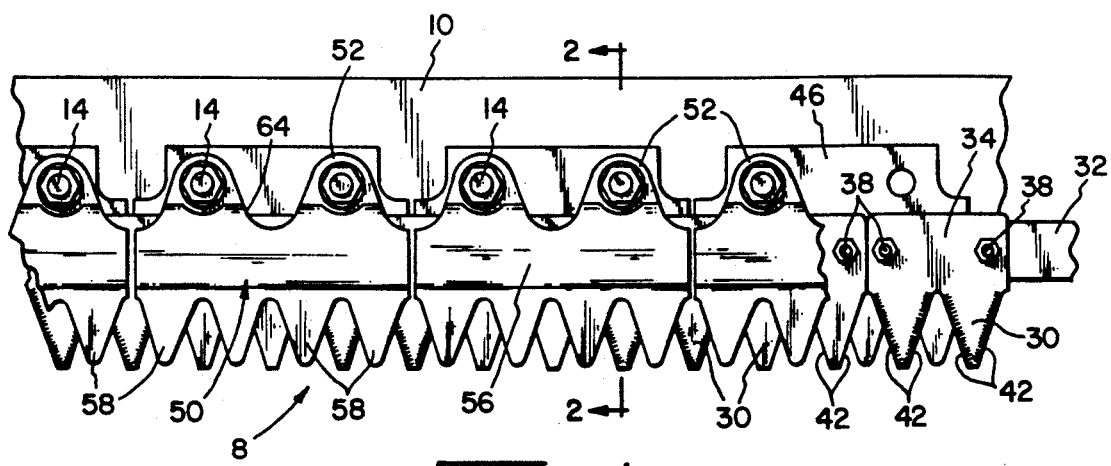
FIG. 1 is a top plan view of a power-operated sickle and cover member according to the present invention.

Corresponding reference characters indicate corresponding parts throughout the several views of the drawings. The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENT

Referring now to the drawings, there is shown a specific embodiment of the present invention where a power-operated sickle for cutting agricultural plants at the stalk thereof is generally designated as 8. A sickle bar 10 is provided and is made of steel or other suitable material. Sickle bar 10 is generally flat, elongate and rectangularly-shaped in cross section as shown, for example, in FIG. 2. A plurality of holes 12 are provided for receiving a bolt 14 therethrough. Sickle bar 10 is adapted to be mounted on a combine, tractor, or other similar equipment extending outwardly therefrom horizontally over and substantially close to the ground.

Figure 2:
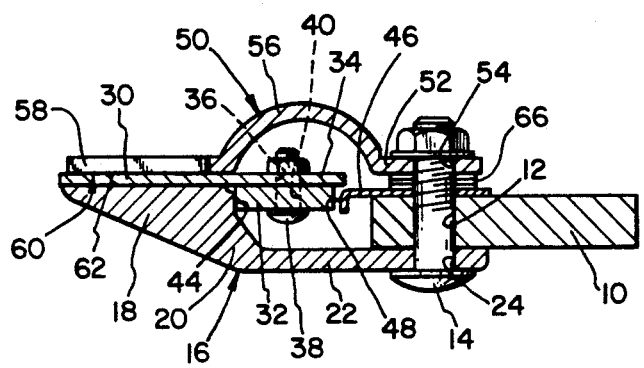
FIG. 2 is a cross-sectional elevational view of the sickle taken along line 2—2 of FIG. 1.
Figure 3:
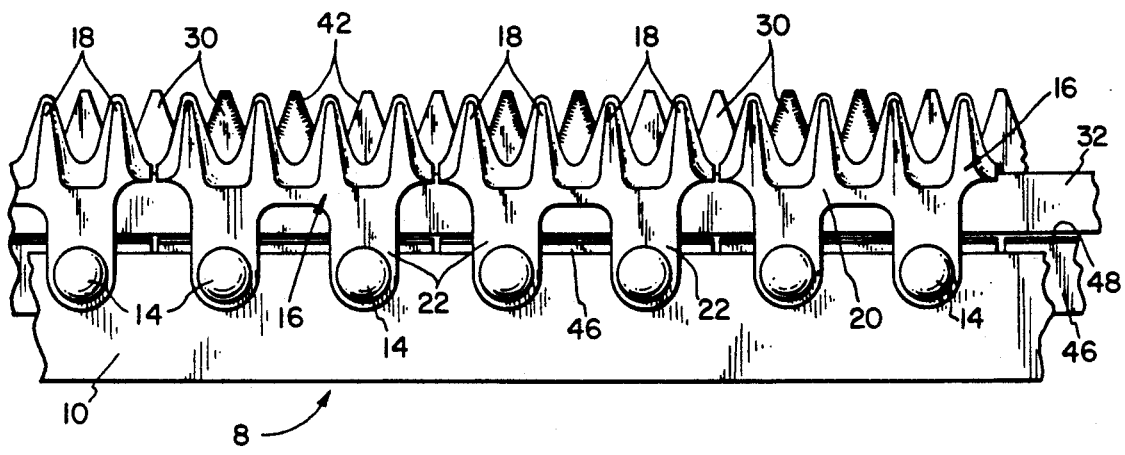
FIG. 3 is a bottom plan view of the sickle according to the present invention; and, FIG. 4 is a perspective view of a portion of the sickle and showing the cover member and assembly according to the present invention.
Figure 4:
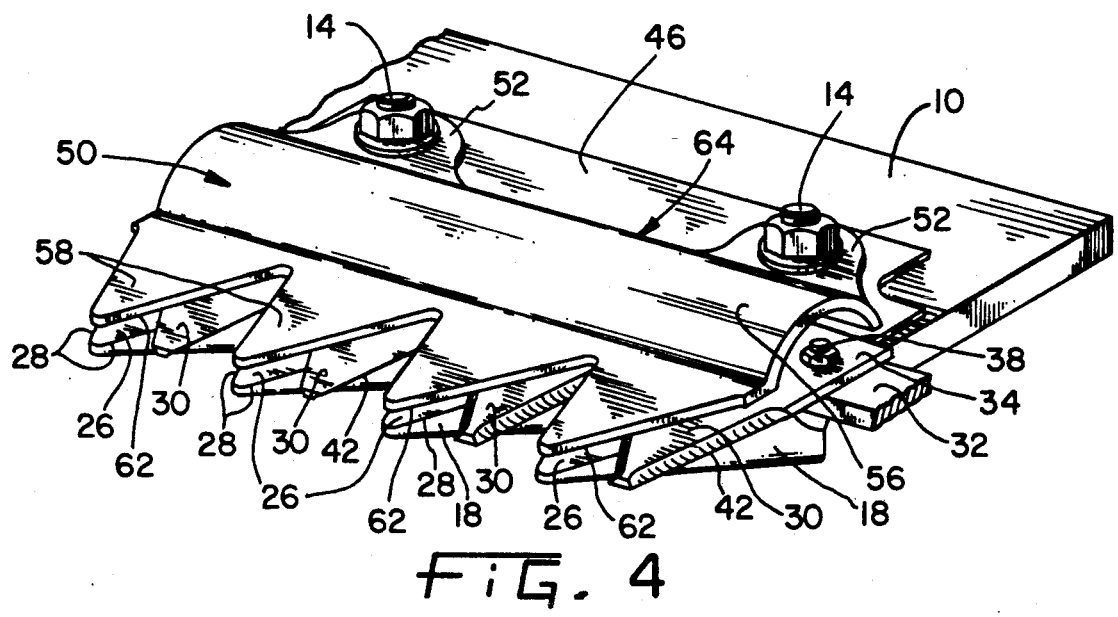

Power-operated sickle 8 includes a plurality of underguard members 16 attached to the sickle bar 10 with bolts 14. More specifically, as shown in FIGS. 2 and 3, underguard members 16 have four underside teeth 18 formed at the end of a generally flat elongate portion 20. At the other end of flat elongate portion 20 there are formed two ears 22 having a hole 24 therein corresponding with holes 12 of sickle bar 10 and adapted to receive bolt 14 therethrough. Underside teeth 18 have a flat upper surface 26 which is generally triangularly-shaped terminating in cutting edges 28. Preferably, underguard members 16 are made of cast iron or metal. Each underguard member 16 includes four underside teeth 18 extending forwardly as shown.

A plurality of cutting teeth 30 are provided and are attached to elongate drive bar 32. More specifically, cutting teeth 30 are generally flat and include a flat back section 34 with holes 36 therein adapted to receive drive bar bolts 38 therethrough. Holes 36 correspond with drive bar holes 40 as shown in FIG. 2. Accordingly, cutting teeth 30 are attached to drive bar 32 with drive bar bolts 38 received through corresponding cutting teeth holes 36 and drive bar holes 40. Preferably, two teeth 30, as shown in FIG. 1, are formed with a flat back section 34 as an integral unit and are attached to drive bar 32 with two bolts 38. Further, cutting teeth 30 include sharp cutting edges 42 for acting against a stationary cutting edge and cutting the stalk of plants. Cutting teeth 30 are also preferably made of a hardened steel material for increasing the life span thereof.

The drive bar 32 is made of a steel material and is generally flat, elongate, and rectangularly-shaped in cross section as shown in FIG. 2. Drive bar 32 is attached to a known and customary drive mechanism (not shown) and is reciprocally driven thereby in a known and customary fashion. Accordingly, the cutting teeth 30 are also reciprocally driven and provide the necessary cutting action. Drive bar 32 is retained laterally as more clearly shown in FIG. 2 between flat edge 44 of underguard members 16 and retaining clips 46 having a flat elongate edge 48. Retaining clips 46 are held in place with bolts 14 which are received through corresponding holes within the retaining clips 46. Thus, the retaining clips 46 are attached to sickle bar 10 and reference the flat elongate edge 48 therefrom.

Cutting teeth 30 are held in place and, along with drive bar 32, are covered with a plurality of cover members 50 attached to sickle bar 10. More specifically, cover members 50 include flat attachment ears 52 toward the back thereof. Attachment ears 52 have attachment holes 54 therethrough corresponding with and adapted to receive bolts 14 therethrough. Accordingly, cover members 50 are attached to sickle bar 10 via bolts 14. A semi-circular section 56 extends from attachment ears 52 toward the front of sickle 8. Section 56 extends over and covers the reciprocating drive bar 32, bolts 38 and the generally flat back sections 34 of cutting teeth 30. At the forward end of semi-circular section 56 there are provided upper teeth 58 extending over underside teeth 18 and sandwiching reciprocating cutting teeth 30 therebetween. Preferably, each cover member 50 includes four upper teeth 58 attached to semi-circular section 56. Also, preferably there are provided two attachment ears 52 per cover member 50 for attachment thereof to sickle bar 10.

Upper teeth 58 of cover member 50 include a flat triangularly-shaped under surface 60 slidingly engaging cutting teeth 30. Flat under surface 60 terminates in upper teeth cutting edges 62 that act with the cutting edges 42 of cutting teeth 30 for cutting the stalks of agricultural plants. As shown in the figures, preferably every other set of cutting teeth 42 face upwardly so that along the entire length of power-operated sickle 8 the cutting action is both between the upper teeth 58 and cutting teeth 30 and, also, between the underside teeth 18 and cutting teeth 30. For decreasing costs in manufacturing, cover members 56 are made by a stamping process and out of a metal material.

As more clearly shown in FIG. 1, a recess 64 is provided in the semi-circular section 56 between attachment ears 52. Recess 64 provides an opening between semi-circular section 56 and sickle bar 10 and leading to drive bar 32 wherethrough dirt and soil that may get into the drive bar area can escape.

In operation, as the power-operated sickle 8 is moved forwardly and the stalks of agricultural plants such as soybeans or wheat are cut between cutting teeth 30 and upper and underside teeth 58 and 18, the stalk depending on the combine rotating fingers, combine speed, lean of the plant, etc., will tend to fall back therebehind toward sickle bar 10. During this action, cover member 50 not only provides a cutting edge for the cutting of the stalk but also prevents the stalk or other portions of the plant from coming in contact with the reciprocally driven drive bar 32 and cutting knife flat back sections 34. Accordingly, the plants are prevented from being vibrated thereby and, for example, the pods of soybeans are prevented from breaking prematurely and spilling the beans forwardly of the power-operated sickle 8 and onto the ground. In this fashion, substantially more of the soybeans are harvested successfully and overall yields are increased.

So as to properly locate upper teeth 58 above underside teeth 18 and leaving a gap therebetween sufficient for slidingly receiving therein cutting teeth 30, there are provided a plurality of shim members 66 between attachment ears 52 and retaining clips 46 which rest on sickle bar 10. By selectively providing a number of shim members 66, the gap between upper teeth 58 and underside teeth 18 is selectively adjusted. Preferably, the shim members are washers having a hole therethrough receiving and circumscribing bolts 14. With shim members 66, the gap between upper and underside teeth 58 and 18 can be adjusted during initial assembly. Also, after use and wear of the various surfaces, the gap may be selectively adjusted by removing shim members 66 and appropriately decreasing the size of the gap and effectively maximizing the cutting action of the sickle.

While the present invention has been particularly described in terms of a preferred embodiment, it should be understood that no limitation of the scope of the invention is intended thereby, and that the scope of the invention includes variations, uses or adaptations of the invention following the general principles thereof, including such departures from the present disclosure as come within known or customary practice in the art to which this invention pertains, limited only by the claims appended hereto.

What is claimed is:

1. In a power-operated sickle for cutting agricultural plants including a plurality of cutting teeth attached to a drive bar slidably retained on a stationary horizontally disposed sickle bar, said drive bar and cutting teeth being reciprocally driven, and a plurality of underside teeth attached to said sickle bar, the improvement comprising:

a plurality of cover means attached to said sickle bar and extending over and covering substantially the entire drive bar, said cover means further including a plurality of upper teeth extending over said underside teeth and sandwiching said reciprocating cutting teeth therebetween, for preventing a plant cut between said cutting teeth and said upper and underside teeth from coming in contact with said reciprocally driven drive bar.

2. The power-operated sickle of claim 1 wherein both said upper and underside teeth include cutting edges and said cutting teeth include corresponding cutting edges acting therewith and cutting against both said upper and underside teeth.

3. The power-operated sickle of claim 1 wherein each said cover means includes four teeth.

4. The power-operated sickle of claim 1 wherein each said cover means is attached to said sickle bar with two bolts received through attachment holes in said cover means and corresponding holes in said sickle bar.

5. The power-operated sickle of claim 1 further comprising gap adjustment means for selectively adjusting the gap distance between said upper and underside teeth whereat said cutting teeth are reciprocally received.

6. The power-operated sickle of claim 5 wherein said gap adjustment means includes a plurality of bolts received through holes in said cover means and corresponding holes in said sickle bar whereby said cover means is retained on said sickle bar, and shim means between said sickle bar and said cover means for adjusting the distance therebetween.

7. The power-operated sickle of claim 6 wherein said shim means includes a plurality of washers circumscribing said bolts.

8. The power-operated sickle of claim 1 wherein said cover means includes a semi-circular section extending between said attachment to said sickle bar and said upper teeth, said semi-circular section extending over and covering said drive bar.

9. The power-operated sickle of claim 8 wherein a recess is provided in said semi-circular section creating an opening between said semi-circular section and said sickle bar leading to said drive bar.

10. A power-operated sickle for cutting agricultural plants comprising:

a plurality of cutting teeth attached to a drive bar;
a stationary horizontally disposed sickle bar, said drive bar slidably retained on said sickle bar;
a plurality of underside teeth attached to said sickle bar and extending forwardly therefrom; and,
cover means attached to said sickle bar and extending forwardly therefrom over and covering substantially the entire drive bar, said cover means further including a plurality of upper teeth extending forwardly from said sickle bar over said underside teeth and sandwiching said cutting teeth therebetween, for preventing a plant cut between said cutting teeth and said upper and underside teeth from coming in contact with said reciprocally-driven drive bar.

11. The power-operated sickle of claim 10 wherein both said upper and underside teeth include cutting edges and said cutting teeth include corresponding cutting edges acting therewith and cutting against both said upper and underside teeth.

12. The power-operated sickle of claim 10 including a plurality of cover means and wherein each said cover means includes four teeth.

13. The power-operated sickle of claim 10 including a plurality of cover means and wherein each said cover means is attached to said sickle bar with two bolts received through attachment holes in said cover means and corresponding holes in said sickle bar.

14. The power-operated sickle of claim 10 further comprising gap adjustment means for selectively adjusting the gap distance between said upper and underside teeth whereat said cutting teeth are reciprocally received.

15. The power-operated sickle of claim 14 wherein said gap adjustment means includes a plurality of bolts received through holes in said cover means and corresponding holes in said sickle bar whereby said cover means is retained on said sickle bar, and shim means between said sickle bar and said cover means for adjusting the distance therebetween.

16. The power-operated sickle of claim 15 wherein said shim means includes a plurality of washers circumscribing said bolts.

17. The power-operated sickle of claim 10 wherein said cover means includes a semi-circular section extending between said attachment to said sickle bar and said upper teeth, said semi-circular section extending over and covering said drive bar.

18. The power-operated sickle of claim 17 wherein a recess is provided in said semi-circular section creating an opening between said semi-circular section and said sickle bar leading to said drive bar.

* * * * *